United States Patent
Clauson et al.

(12) 
(10) Patent No.: US 6,179,359 B1
(45) Date of Patent: Jan. 30, 2001

(54) INTERIOR TRIM TO WINDSHIELD MOUNTING ARRANGEMENT

(75) Inventors: Mitchell D. Clauson, Sterling Heights; Thomas K. O'Connor, Troy, both of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/373,039

(22) Filed: Aug. 12, 1999

(51) Int. Cl.[7] ..................................................... B60R 13/02
(52) U.S. Cl. ..................................... 296/39.1; 296/203.02; 52/716.5
(58) Field of Search ............................... 296/39.1, 203.02, 296/194; 52/716.3, 716.4, 716.5

(56) References Cited

U.S. PATENT DOCUMENTS

| | | | |
|---|---|---|---|
| 1,439,919 | 12/1922 | Snell . | |
| 3,401,075 | * 9/1968 | Jackson | 161/64 |
| 3,505,772 | * 4/1970 | Claire et al. | 52/511 |
| 4,229,036 | * 10/1980 | Toda | 296/39 R |
| 4,563,374 | * 1/1986 | Treber et al. | 52/716 |
| 4,707,008 | * 11/1987 | Falco | 52/716 |
| 5,273,340 | 12/1993 | Nelson et al. . | |
| 5,415,554 | * 5/1995 | Kempkers et al. | 296/39.1 |
| 5,584,526 | 12/1996 | Soldner . | |
| 5,660,426 | * 8/1997 | Sugimori et al. | 296/39.1 |
| 5,695,236 | 12/1997 | Banno et al. . | |
| 5,711,119 | 1/1998 | Cornils et al. . | |
| 5,741,044 | * 4/1998 | Kawai et al. | 296/39.1 |
| 5,815,997 | 10/1998 | Cornils et al. . | |
| 5,992,914 | * 11/1999 | Gotoh et al. | 296/39.1 |
| 6,059,342 | * 5/2000 | Kawai et al. | 296/39.1 |
| 6,068,320 | * 5/2000 | Miyano | 296/39.1 |
| 6,085,483 | * 7/2000 | Kurosaki | 52/716.5 |
| 6,095,593 | * 8/2000 | Johann et al. | 296/39.1 |

\* cited by examiner

*Primary Examiner*—Dennis H. Pedder
*Assistant Examiner*—Kiran Patel
(74) *Attorney, Agent, or Firm*—Marc Lorelli

(57) ABSTRACT

A mounting arrangement for coupling a trim member to a structural member of a motor vehicle. The motor vehicle includes a structural member and a glass member. A longitudinally extending formation is coupled to the glass member. The trim member is a longitudinally extending trim member having an edge that extends along its length. When the trim member is coupled to the structural member, the edge of the trim member contacts or engages at least a portion of the longitudinally extending formation so as to accurately position the trim member relative to the glass member.

20 Claims, 4 Drawing Sheets

INTERIOR TRIM TO WINDSHIELD MOUNTING ARRANGEMENT

BACKGROUND OF THE INVENTION

1. Technical Field

The present invention generally pertains to motor vehicles. More particularly, the present invention pertains to a trim panel assembly for a motor vehicle. More specifically, but without restriction to the particular embodiment and/or use which is shown and described for purposes of illustration, the present invention relates to a mounting arrangement for attaching a trim panel to a vehicle windshield and functioning as a link between the glass and the A-pillar trim of a vehicle while still allowing the necessary removal of the trim panel for servicing.

2. Discussion

In a conventional vehicle, the A-pillar separates the windshield from the side door window. The plastic A-pillar trim is off-set from the windshield so as to avoid contact between the plastic of the trim and the glass of the windshield that would cause noise typically termed as squeaks, buzzes and/or rattles. A portion of the light reflecting off the A-pillar is reflected off the windshield through the off-set and into the passenger compartment of the vehicle enabling the vehicle occupants to see many of the features of the A-pillar, including the sheet metal edges, wires, etc.

As this view is not aesthetically pleasing, vehicle manufacturers have resorted to blackening-out a portion of the windshield proximate the offset to inhibit the transmission of light through the windshield in this area and eliminate the transmission of the image of the A-pillar into the passenger compartment. While this strategy has been successful at eliminating the undesired reflection of the A-pillar, several drawbacks are apparent.

One such drawback stems from component "stack-up" and the resulting fact that the location of the offset can not be determined with precision. Consequently, the blackened-out portion is enlarged to compensate for this variable, increasing the cost of the window and potentially reducing the visibility of the vehicle occupants.

The proximity of the edges of the blackened-out portion to the edges of the trim panels causes the vehicle occupants to compare the spacial relationship of the blackened-out portion and the trim panel. Using the edges of the blackened-out portion as a reference line, vehicle occupants are easily able to discern variances in the position of the trim panel which would otherwise go unnoticed. Such comparisons frequently lead to complaints relating to the fit and finish of the vehicle interior which are extremely costly to improve and provide no functional benefit to the vehicle.

Consequently, there remains a need in the art for an improved mounting arrangement for positioning a trim panel relative to a blackened-out portion of the windshield with greater accuracy.

SUMMARY OF THE INVENTION

It is therefore one object of the present invention to provide a mounting arrangement for coupling a trim member to a structural member which positions the trim member relative to a blackened-out portion of the windshield in an accurate manner.

It is another object of the present invention to provide a mounting arrangement for coupling a trim member to a structural member which utilizes a longitudinally extending member coupled to the vehicle windshield to cause an edge of a trim member to reside at a predetermined position.

In one form, the present invention provides a vehicle including a structural member, a glass panel, a longitudinally extending trim member, and a longitudinally extending formation. The glass panel is coupled to the structural member. The longitudinally extending trim member is attached to the structural member and includes an edge that extends therewith. The longitudinally extending formation is coupled to the glass member and contacts the edge of the trim member.

In another form, the present invention provides a mounting arrangement in combination with a vehicle having an A-pillar coupled to a windshield. The combination includes at least one mounting member. The windshield is coupled to the A-pillar. The windshield including a blackened-out portion adjacent an edge of the windshield. The trim panel is attached to the A-pillar. The at least one mounting member including a first portion secured to the windshield and a second portion secured to a longitudinally extending edge of the trim panel such that the longitudinally extending edge is accurately position relative to the blackened-out portion without being directly attached to the windshield.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
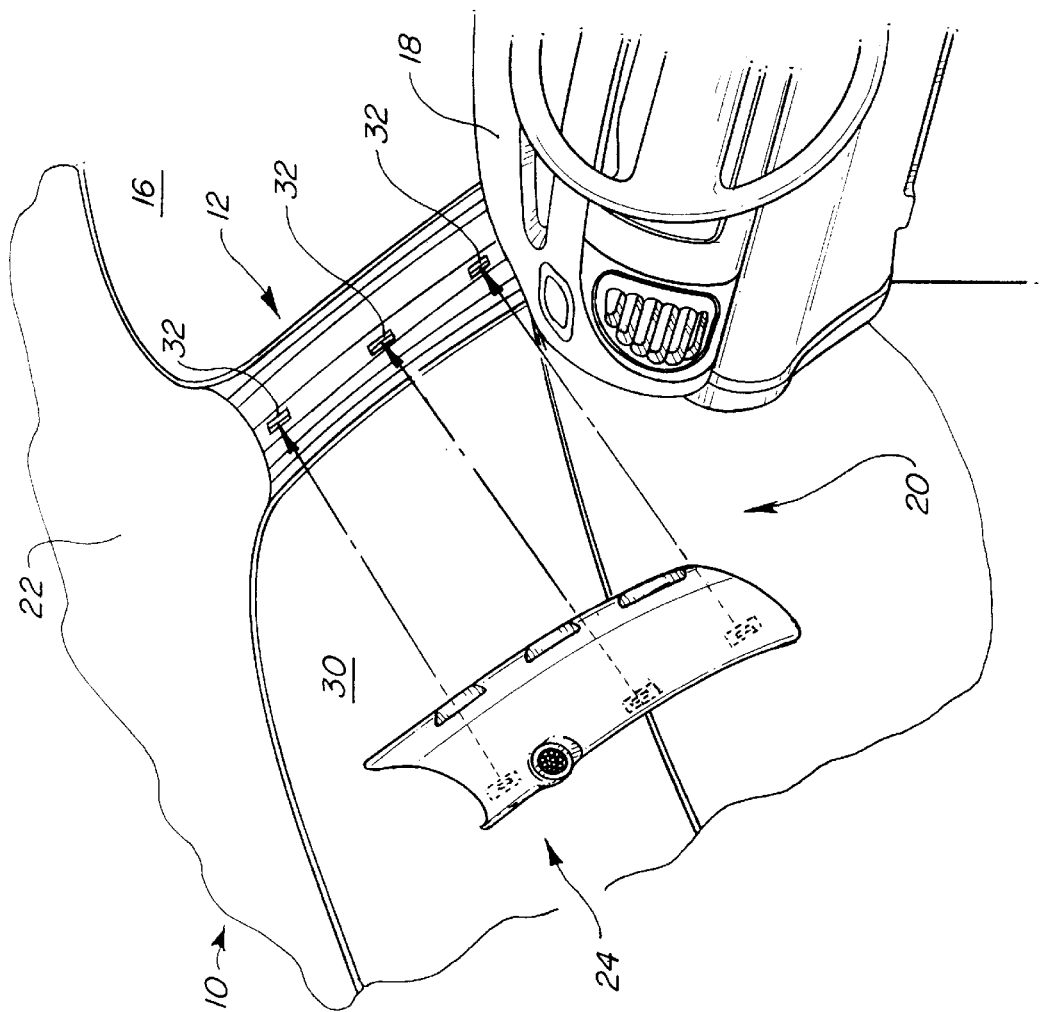
FIG. 1 is a partially exploded perspective view of a portion of a motor vehicle incorporating a trim panel assembly constructed in accordance with the teachings of a preferred embodiment of the present invention.

With initial reference to the partially exploded environmental view of FIG. 1, a vehicle constructed in accordance with the teachings of the present invention is generally indicated by reference numeral 10. Vehicle 10 includes a structural member 12, a windshield assembly 16, an instrument panel 18, a side door assembly 20, a roof liner 22 and a trim assembly 24 for covering structural member 12.

In the particular embodiment illustrated, the structural member is an A-pillar 12 and trim assembly is an A-pillar trim assembly 24. A-pillar trim assembly 24 is operable for covering A-pillar 12 as well as a portion of roof liner 22 and instrument panel 18. A-pillar 12 provides a mounting surface for windshield assembly 16 and separates windshield assembly 16 from the window 30 of side door assembly 20. A-pillar 12 includes a plurality of conventional retention apertures 32 which are spaced apart along the length of A-pillar 12. Retention apertures 32 will be discussed in greater detail, below.

Figure 2:
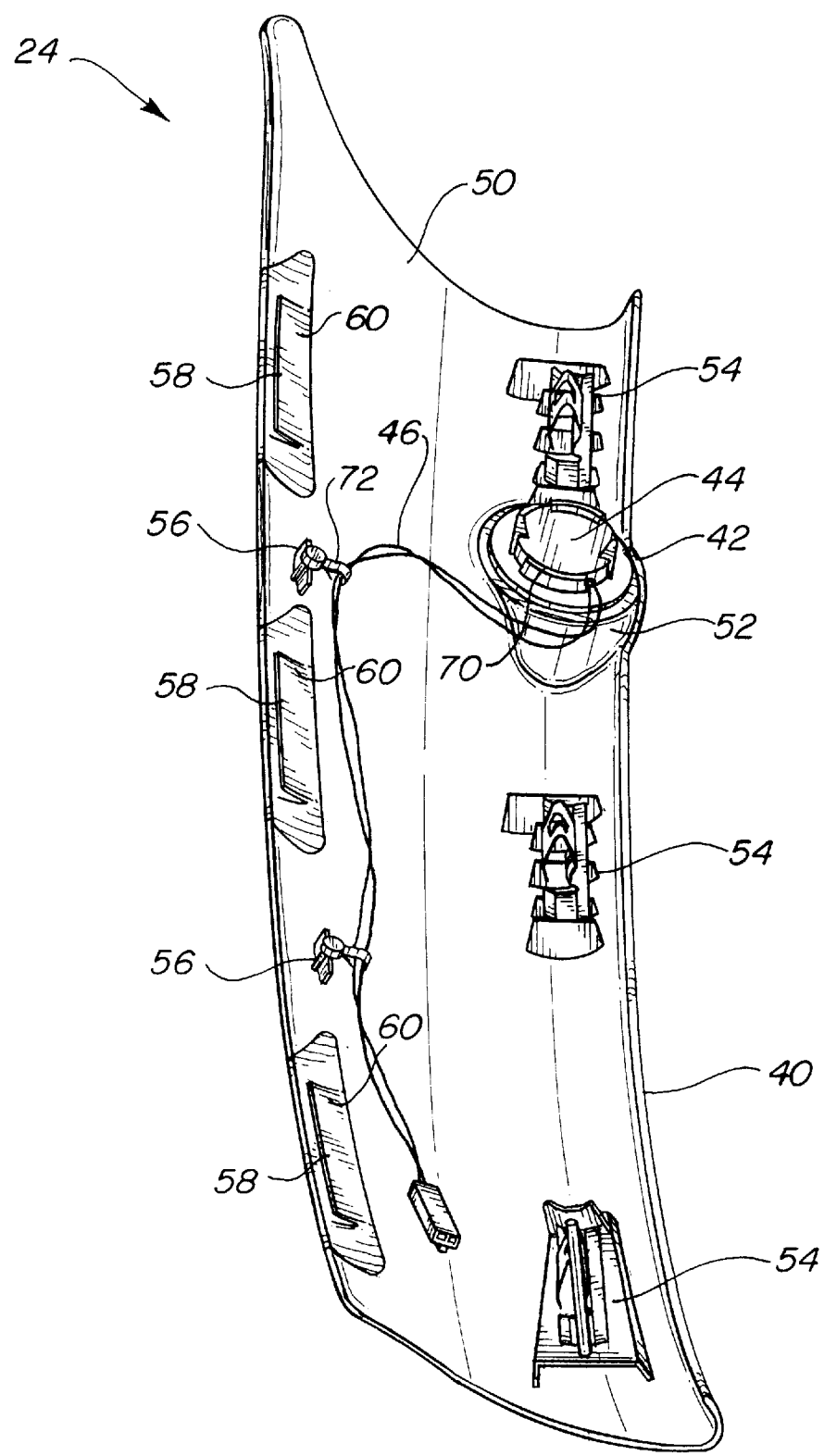
FIG. 2 is an enlarged rear perspective view of the trim panel assembly shown in FIG. 1.

In FIG. 2, A-pillar trim assembly 24 is shown to include a main body or trim panel 40 which is an elongated body structure. Trim assembly 24 includes a conventional speaker assembly 42 having a conventional speaker 44 and a conventional wire harness 46. Body structure 40 is preferably molded from a conventional thermoplastic resin material such as polypropylene or ABS and includes a body portion 50, a speaker retention portion 52, a plurality of conventional retention members 54 spaced apart along the length of body portion 50, a plurality of wire harness anchor tabs 56 spaced apart along the length of body portion 50 and at least one edge 58 which extends longitudinally along at least part of the length of body portion 50. Edge 58 is preferably formed from plastic during the molding process which forms body structure 40. However, edge 58 may also be formed from a clip-like member which is cast into body portion or fastened to body portion 50 through conventional fastening methods such as mechanical fasteners, plastic welding or adhesives.

Figure 3:
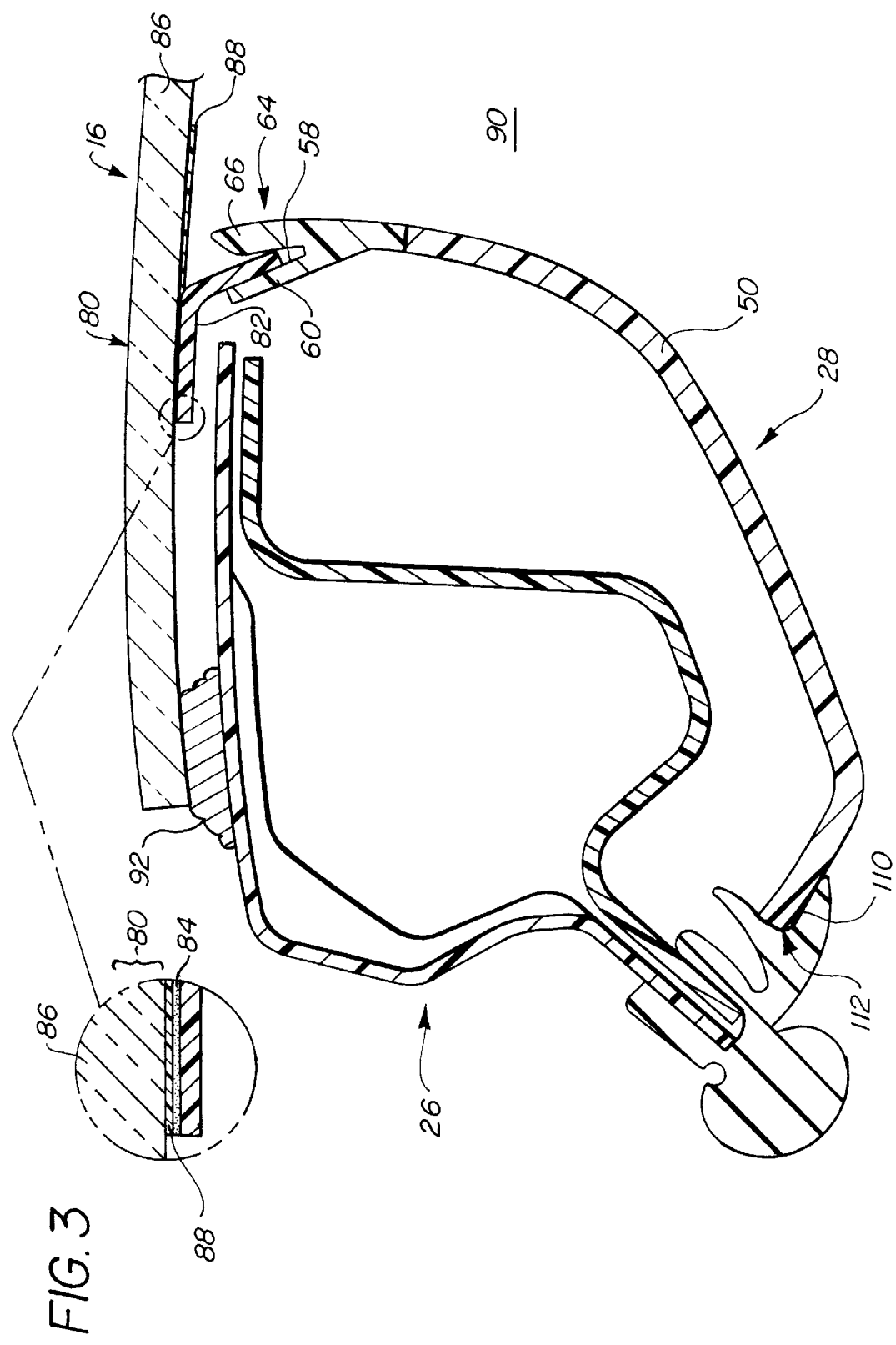
FIG. 3 is a cross-sectional view taken through the A-pillar, windshield, mounting member and trim panel shown in FIG. 1.

With brief additional reference to FIG. 3, edge 58 is formed in the particular embodiment illustrated by a plurality of flanges 60 which extend from body portion 50 at an acute angle. The cross-sectional view of FIG. 3 shows body portion 50 and each flange 60 to form a generally Y-shaped structure 64 wherein flange 60 and a tip 66 of body portion 50 form the forked portion of the "Y".

Referring back to FIG. 2, conventional retention members 54 are configured to cooperate with retention apertures 32 to permit A-pillar trim assembly 24 to be fixedly but removably coupled to A-pillar 12. Speaker retention portion 52 includes an abutting surface (not shown) on which speaker assembly 42 is mounted and a conventional retaining means 70 which fixedly but removably couples speaker assembly 42 to speaker retention portion 52. Wire harness 46 extends from speaker 44 along the length of body portion 50 and is retained by conventional fasteners 72 to wire harness anchor tabs 56. Speaker assembly 42 is operable for sounding an alarm to alert the vehicle occupants to one or more predetermined conditions such as opening a vehicle door (e.g., side door assembly 20) when the vehicle keys are in the vehicle ignition.

In FIG. 3, A-pillar trim assembly 24 is shown in operative association with A-pillar 12 and windshield assembly 16. Windshield assembly 16 includes a windshield 80. A-pillar trim assembly 24 is shown to include a longitudinally extending formation in the form of a mounting member 82 and an adhesive layer 84. Windshield 80 is formed from a conventional glass member 86 and includes a blackened-out portion 88 formed from a conventional blackening material. Blackened-out portion 88 is positioned in the area proximate mounting member 82 toward the interior 90 of vehicle 10. Preferably, blackened-out portion 88 extends under mounting member 82 so as to substantially inhibit the transmission of ultraviolet light to adhesive layer 84. Adhesive layer 84 is preferably formed from a polyurethane adhesive/sealer such as that provided by Essex Specialty Products Inc., Troy, Mich. under their vendor number 573-02. Windshield assembly 16 is fixedly attached to A-pillar 12 through a conventional adhesive material 92.

Figure 4:
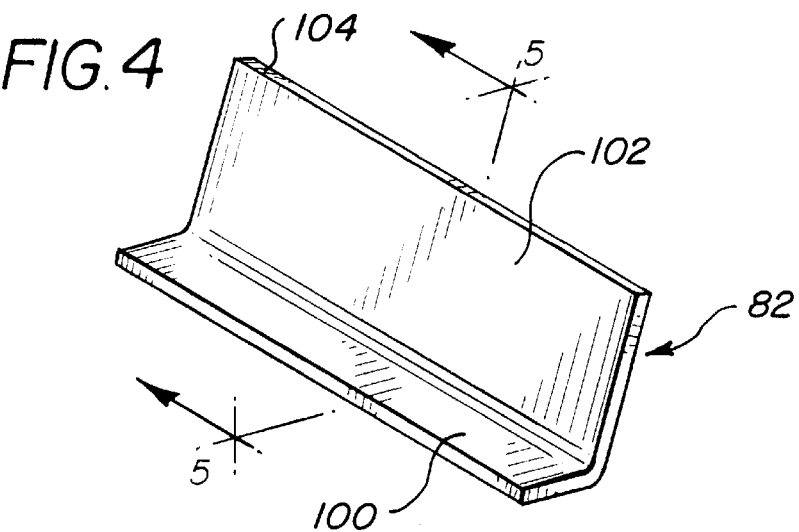
FIG. 4 is an enlarged perspective view of the mounting member shown in FIG. 1.
Figure 5:
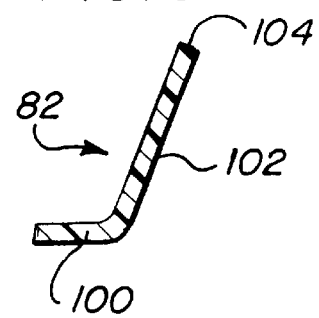
FIG. 5 is a cross-sectional view of the mounting member taken along the line 5—5 in FIG. 4.

With additional reference to FIGS. 4 and 5, mounting member 82 is shown to extend longitudinally along windshield 80 proximate A-pillar 12. Mounting member 82 has a generally L-shaped cross section and may be manufactured from a metal or plastic material which is formed through a molding, extrusion or stamping process. Preferably, mounting member 82 is manufactured from polypropylene and formed through extrusion. Mounting member 82 is shown to include a generally horizontal base portion 100 and a leg portion 102 which depends upwardly from base portion 100 and terminates at a tip 104.

Adhesive layer 84 is disposed at least partially between windshield 80 and mounting member and is operable for fixedly securing mounting member 82 to windshield 80. The adhesive forming adhesive layer 84 may be pre-applied to windshield 80 or to mounting member 82.

With renewed reference to FIG. 3, a technician installing A-pillar trim assembly 24 first positions the edge 110 of body portion 50 into a retaining recess 112 formed into A-pillar 12. The technician then rolls A-pillar trim assembly 24 into A-pillar 12 to position Y-shaped structure 64 such that flanges 60 and tip 66 are disposed about opposite sides of leg portion 102. The technician completes the installation of A-pillar trim assembly 24 by pressing on body portion 50 proximate retention members 54 to cause them to engage retention apertures 32.

The natural resilience of the material from which trim panel 40 is fabricated causes body portion 50 to flex away from mounting member 82. This flexing causes flange 60 to exert a force on leg portion 102 which tends to inhibit relative motion between body portion 50 and mounting member 82 and substantially reduce movement which creates buzzing, rattling and other types of noise which are undesirable to the vehicle occupants.

The generally Y-shaped structure formed by flanges 60 and body portion 50 is particularly advantageous as it is extremely tolerant of many factors involving the fabrication and operation of vehicles, including variances in the positioning of mounting member 82, variances in the resilience of the material which forms body portion 50, and the effect of thermal expansion on the fit and finish of A-pillar trim assembly 24.

Figure 6:
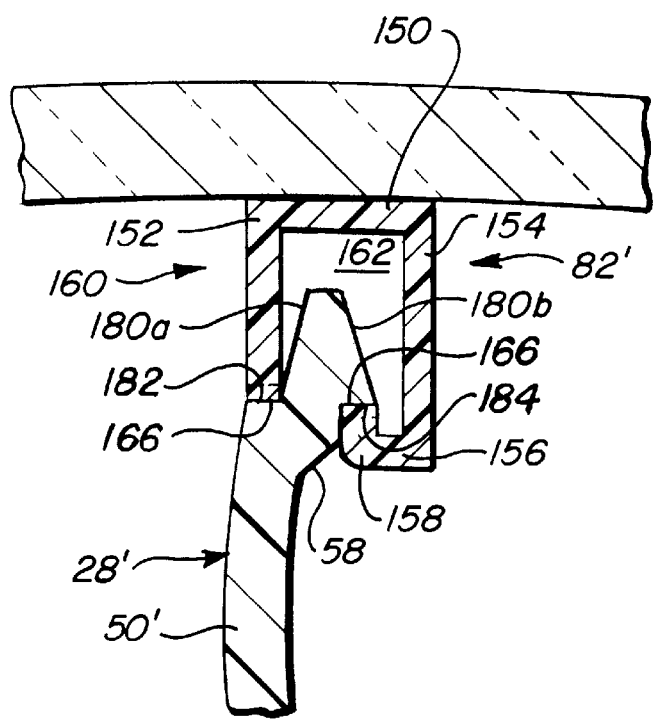
FIG. 6 is a cross-sectional view similar to that of FIG. 3 but showing a mounting member and trim panel edge according to an alternate embodiment of the present invention.

While the attachment system of the present invention has been described thus far as having a generally L-shaped mounting member, those skilled in the art will appreciate that the invention, in its broader aspects, may be constructed somewhat differently. For example, the mounting member and the body portion may be formed to positively interlock as shown in FIG. 6. In this arrangement, the mounting member 82' is constructed with generally horizontal base member 150, first and second sidewall members 152 and 154, respectively, a lower wall member 156 and an intermediate wall member 158. First and second sidewall members 152 and 154 are coupled to and depend generally vertically downward from base member 150. Lower wall member 156 is coupled to the distal end of second wall member 154 and depends toward first wall member 152 in a direction generally perpendicular to second wall member 154. Intermediate wall member 158 is coupled to a distal end of lower wall member 156 and depends upwardly toward base member 150 in a direction generally perpendicular to lower wall member 156. The wall members cooperate to form a structure 160 having a generally G-shaped cross section that includes a hollow central channel 162, an insertion-arresting surface 164 and a withdrawal-arresting surface 166.

The edge 58' of body portion 50' is formed at one end from two inwardly angled surfaces 180a and 180b which permit edge 58' to be easily inserted into hollow central channel 162. First and second engagement surfaces 182 and 184, respectively, are formed from the slight but abrupt offset between edge 58' and the remainder of body portion 50'. First engagement surface 182 is operable for contacting insertion-arresting surface 164 to halt the insertion of edge 58' into hollow central channel 162. Second engagement surface 184 is operable for contacting withdrawal-arresting surface 166 to inhibit the withdrawal of edge 58' from hollow central channel 162.

As with the other embodiment of the invention shown herein, mounting member 82' is operable for fixing edge 58' in a predetermined position so as to position A-pillar trim assembly 24' in a desired manner relative to blackened-out portion 88.

While the invention has been described in the specification and illustrated in the drawings with reference to certain preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. A vehicle comprising:
   a structural member;
   a glass member coupled to the structural member;
   a longitudinally extending trim member attached to the structural member and having an edge that extends longitudinally therewith; and
   a longitudinally extending formation coupled to the glass member for contacting the edge of the trim member.

2. The attachment system of claim 1, wherein the structural member is a vehicle A-pillar and the longitudinally extending trim member is an A-pillar trim panel.

3. The attachment system of claim 1, wherein the longitudinally extending formation is coupled to the glass member with an adhesive material.

4. The attachment system of claim 3, further comprising a material layer disposed between the adhesive and the glass member and adapted to inhibit the transmission of ultraviolet radiation into the adhesive material.

5. The attachment system of claim 1, wherein the cross-section of the longitudinally extending formation is generally L-shaped.

6. The attachment system of claim 5, wherein the trim member includes a main body portion and a flange defining an opening, the opening receiving a leg of the generally L-shaped longitudinally extending formation.

7. The attachment system of claim 1, wherein the cross-section of the longitudinally extending formation is generally G-shaped.

8. The attachment system of claim 7, wherein the at least one edge of the longitudinally extending trim member includes a tapered insertion portion and at least one engagement surface operable for resisting the withdrawal of the at least one edge from the longitudinally extending formation.

9. A mounting arrangement in combination with a vehicle having a structural member coupled to a glass panel comprising:
   the structural member;
   the glass panel coupled to the structural member, the glass panel including a blackened-out portion adjacent an edge of the glass panel;
   a trim panel attached to the structural member; and
   at least one mounting member including a first portion secured to the glass panel and a second portion secured to a longitudinally extending edge of the trim panel such that the longitudinally extending edge is accurately position relative to the blackened-out portion without being directly attached to the glass panel.

10. The mounting arrangement in combination with a vehicle having a structural member coupled to a glass panel of claim 9, wherein the first portion of the at least one mounting member is adhesively secured to the glass panel.

11. The mounting arrangement in combination with a vehicle having a structural member coupled to a glass panel of claim 9, wherein said at least one mounting member includes a plurality of mounting members interconnecting the glass panel and the trim panel.

12. The mounting arrangement in combination with a vehicle having a structural member coupled to a glass panel of claim 9, wherein the cross-section of the mounting member is generally L-shaped.

13. The mounting arrangement in combination with a vehicle having a structural member coupled to a glass panel of claim 9, wherein the trim panel includes a main body portion and a flange defining an opening, the opening receiving the second portion of the mounting member.

14. The mounting arrangement in combination with a vehicle having a structural member coupled to a glass panel of claim 9, wherein the at least one mounting member defines an opening and further wherein longitudinally extending edge of the trim panel includes and a free end insertable into the opening, the free end having a tapered insertion portion and at least one engagement surface operable for resisting the withdrawal of the free end from the at least one mounting member.

15. A mounting arrangement in combination with a vehicle having an A-pillar coupled to a windshield comprising:
   the A-pillar;
   the windshield coupled to the A-pillar, the windshield including a blackened-out portion adjacent an edge of the windshield;
   a trim panel attached to the A-pillar; and
   at least one mounting member including a first portion secured to the windshield and a second portion secured to a longitudinally extending edge of the trim panel such that the longitudinally extending edge is accurately position relative to the blackened-out portion without being directly attached to the windshield.

16. The mounting arrangement in combination with a vehicle having an A-pillar coupled to a windshield of claim 15, wherein the first portion of the at least one mounting member is adhesively secured to the windshield.

17. The mounting arrangement in combination with a vehicle having an A-pillar coupled to a windshield of claim 15, wherein the at least one mounting member includes a plurality of mounting members interconnecting the windshield and the trim panel.

18. The mounting arrangement in combination with a vehicle having an A-pillar coupled to a windshield of claim 15, wherein the cross-section of the mounting member is generally L-shaped.

19. The mounting arrangement in combination with a vehicle having an A-pillar coupled to a windshield of claim 15, wherein the trim panel includes a main body portion and a flange defining an opening, the opening receiving the second portion of the mounting member.

20. The mounting arrangement in combination with a vehicle having an A-pillar coupled to a windshield of claim 15, wherein the at least one mounting member defines an opening and further wherein longitudinally extending edge of the trim panel includes and a free end insertable into the opening, the free end having a tapered insertion portion and at least one engagement surface operable for resisting the withdrawal of the free end from the at least one mounting member.

* * * * *